US010656970B2

(12) United States Patent
Xia et al.

(10) Patent No.: US 10,656,970 B2
(45) Date of Patent: May 19, 2020

(54) SCHEDULING GRAPH COMPUTING ON HETEROGENEOUS PROCESSING RESOURCES BASED ON ENERGY EFFICIENCY

(71) Applicant: Futurewei Technologies, Inc., Plano, TX (US)

(72) Inventors: Yinglong Xia, San Jose, CA (US); Hui Zang, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 213 days.

(21) Appl. No.: 15/279,315

(22) Filed: Sep. 28, 2016

(65) Prior Publication Data

US 2018/0089002 A1    Mar. 29, 2018

(51) Int. Cl.
    *G06F 9/46*      (2006.01)
    *G06F 9/50*      (2006.01)
    (Continued)

(52) U.S. Cl.
    CPC ............ *G06F 9/5094* (2013.01); *G06F 1/324* (2013.01); *G06F 1/3206* (2013.01); *G06F 1/329* (2013.01); *G06F 1/3296* (2013.01); *G06F 9/4881* (2013.01); *G06F 9/4893* (2013.01); *G06F 9/5038* (2013.01); *G06F 9/5044* (2013.01); *Y02D 10/22* (2018.01); *Y02D 10/24* (2018.01)

(58) Field of Classification Search
None
See application file for complete search history.

(56) References Cited

U.S. PATENT DOCUMENTS 6,178,542 B1    1/2001   Dave
8,612,984 B2 *   12/2013   Bell, Jr. ................ G06F 9/5094
                                           718/102

(Continued)

FOREIGN PATENT DOCUMENTS

CN        102474891 A     5/2012

OTHER PUBLICATIONS

International Search Report and Written Opinion from PCT Application PCT/CN2017/102067, dated Nov. 24, 2017.

(Continued)

*Primary Examiner* — Bing Zhao
(74) *Attorney, Agent, or Firm* — Schwegman Lundberg & Woessner, P.A.

(57) ABSTRACT

An apparatus and method are provided for scheduling graph computing on heterogeneous platforms based on energy efficiency. A scheduling engine receives an edge set that represents a portion of a graph comprising vertices with at least one edge connecting two or more of the vertices. The scheduling engine obtains an operating characteristic for each processing resource of a plurality of heterogeneous processing resources. The scheduling engine computes, based on the operating characteristics and an energy parameter, a set of processing speed values for the edge set, each speed value corresponding to a combination of the edge set and a different processing resource of the plurality of heterogeneous processing resources. The scheduling engine identifies an optimal processing speed value from the set of computed speed values for the edge set.

18 Claims, 11 Drawing Sheets

(51) Int. Cl.
*G06F 9/48* (2006.01)
*G06F 1/329* (2019.01)
*G06F 1/3206* (2019.01)
*G06F 1/324* (2019.01)
*G06F 1/3296* (2019.01)

(56) References Cited

U.S. PATENT DOCUMENTS

| | | |
|---|---|---|
| 2011/0040888 A1 | 2/2011 | Krishnaswamy et al. |
| 2013/0086402 A1* | 4/2013 | Pires Dos Reis Moreira ............. G06F 1/329 713/322 |
| 2014/0213316 A1 | 7/2014 | Liu et al. |
| 2014/0286191 A1 | 9/2014 | Solihin |
| 2017/0124452 A1* | 5/2017 | Tucker .................. G06F 9/5038 |

OTHER PUBLICATIONS

Zeng et al., "An Executing Method for Time and Energy Optimization in Heterogeneous Computing," 2011 IEEE/ACM International Conference on Green Computing and Communications, 2011, pp. 69-74.

* cited by examiner

| Shard 310 | | |
|---|---|---|
| Src | Dst | Value |
| 301 | 302 | 0.3 |
| 303 | 302 | 0.2 |
| 304 | 301 | 1.4 |
| 305 | 301 | 0.5 |
|  | 302 | 0.6 |
| 306 | 302 | 0.8 |

| Shard 315 | | |
|---|---|---|
| Src | Dst | Value |
| 301 | 303 | 0.4 |
| 302 | 303 | 0.3 |
| 303 | 304 | 0.8 |
| 305 | 303 | 0.2 |
| 306 | 304 | 1.9 |

| Shard 320 | | |
|---|---|---|
| Src | Dst | Value |
| 302 | 305 | 0.6 |
| 303 | 305 | 0.9 |
|  | 306 | 1.2 |
| 304 | 305 | 0.3 |
| 305 | 306 | 1.1 |

| Shard 310 | | |
|---|---|---|
| Src | Dst | Value |
| 301 | 302 | 0.3 |
| 303 | 302 | 0.2 |
| 304 | 301 | 1.4 |
| 305 | 301 | 0.5 |
|  | 302 | 0.6 |
| 306 | 302 | 0.8 |

(540: rows with src 301; 545: rows with src 303, 304; 550: rows with src 305, 306)

| Shard 315 | | |
|---|---|---|
| Src | Dst | Value |
| 301 | 303 | 0.4 |
| 302 | 303 | 0.3 |
| 303 | 304 | 0.8 |
| 305 | 303 | 0.2 |
| 306 | 304 | 1.9 |

(555: rows with src 301, 302, 303)

| Shard 320 | | |
|---|---|---|
| Src | Dst | Value |
| 302 | 305 | 0.6 |
| 303 | 305 | 0.9 |
|  | 306 | 1.2 |
| 304 | 305 | 0.3 |
| 305 | 306 | 1.1 |

(560: rows with src 302, 303)

*Fig. 5B*

Allocation Matrix 570 — Processing Resource *j* × Edge Set *i*

| | | | 540 | |
|---|---|---|---|---|
| 545 | | | | |
| | 550 | | | |
| | | | | 560 |
| | | | 555 | |

Allocation Matrix 575 — Processing Resource *j* × Edge Set *i*

| 540 | | | | |
|---|---|---|---|---|
| | 545 | | | |
| | | 550 | | |
| | | | 560 | |
| | | | | 555 |

*Fig. 5C*

SCHEDULING GRAPH COMPUTING ON HETEROGENEOUS PROCESSING RESOURCES BASED ON ENERGY EFFICIENCY

FIELD OF THE INVENTION

The present invention relates to graph computing, and more particularly to scheduling graph computing on heterogeneous platforms based on energy efficiency.

BACKGROUND

A graph is a structure comprising vertices (or nodes) connected by edges, representing relationships between objects or processes. For example, a graph may represent connections between different users of a social networking application. A graph may represent communication paths within a network or organization of a data structure. The use of graph computing is gaining popularity in big data analytics and is often performed on multiple machines, for example, within a datacenter. As data volumes and computational workloads increase, there is a desire to limit or reduce power consumption to comply with green computing goals and/or to limit financial costs.

Additionally, datacenters may include a variety of different platforms. The platforms are heterogeneous and each platform may include one or more processors or processing cores. The processors and processing cores may employ dynamic voltage and frequency scaling, may be fabricated in different processes, and may have varying power consumptions. Therefore, an opportunity exists to balance power consumption against execution speed for graph computing performed by heterogeneous platforms.

SUMMARY

A graph computation system, scheduling engine, computer readable medium, and method are provided for scheduling graph computing on heterogeneous platforms based on energy efficiency. Components of the graph computation system may include a plurality of heterogeneous processing resources and a scheduling engine that is in communication with the plurality of heterogeneous processing resources. The scheduling engine is configured to receive an edge set that represents a portion of a graph comprising vertices with at least one edge connecting two or more of the vertices and obtain an operating characteristic for each processing resource of a plurality of heterogeneous processing resources. The scheduling engine computes, based on the operating characteristics and an energy parameter, a set of processing speed values for the edge set, each speed value corresponding to a combination of the edge set and a different processing resource of the plurality of heterogeneous processing resources and identifies an optimal processing speed value from the set of computed speed values for the edge set.

In a first embodiment, the edge set is allocated to the processing resource associated with the optimal processing speed value.

In a second embodiment (which may or may not be combined with the first embodiment), the edge set is determined to be available to the processing resource associated with the optimal processing speed value before the edge set is allocated to the processing resource.

In a third embodiment (which may or may not be combined with the first and/or second embodiments), additional edge sets that represent additional portions of the graph are received and for each additional edge set, an additional set of processing speed values is computed based on the operating characteristics, a workload associated with the additional edge set, and the energy parameter. For each additional edge set, an optimal processing speed value is identified from the additional set of processing speed values computed for the additional edge set.

In a fourth embodiment (which may or may not be combined with the first, second, and/or third embodiments), each additional edge set is iteratively allocated to a different processing resource of the plurality of processing resources and produce a final allocation that minimizes differences between the optimal processing speed values and actual processing speed values, and each actual processing speed value is computed using the operating characteristic of the processing resource and the workload associated with the additional edge set that is allocated to the processing resource.

In a fifth embodiment (which may or may not be combined with the first, second, third, and/or fourth embodiments), differences between the optimal processing speed value and the actual processing speed value for each of the additional edge sets are summed to produce a sum of differences and the sum of differences for the final allocation is less than a sum of differences for any other allocation.

In a sixth embodiment (which may or may not be combined with the first, second, third, fourth, and/or fifth embodiments), the plurality of processing resources processes the edge set and the additional edge sets in parallel according to the final allocation.

In a seventh embodiment (which may or may not be combined with the first, second, third, fourth, fifth, and/or sixth embodiments), the additional edge sets and the plurality of processing resources are organized as a bipartite graph to produce the final allocation.

In an eighth embodiment (which may or may not be combined with the first, second, third, fourth, fifth, sixth, and/or seventh embodiments), the operating characteristic defines a relationship between execution speed and power consumption for a particular processing resource of the plurality of processing resources.

In a ninth embodiment (which may or may not be combined with the first, second, third, fourth, fifth, sixth, seventh, and/or eighth embodiments), the energy parameter controls a balance between execution time and energy consumption for executing the edge set.

In a tenth embodiment (which may or may not be combined with the first, second, third, fourth, fifth, sixth, seventh, eighth, and/or ninth embodiments), the optimal speed is a fastest speed in the set of computed speed values for the edge set.

In an eleventh embodiment (which may or may not be combined with the first, second, third, fourth, fifth, sixth, seventh, eighth, ninth, and/or tenth embodiments), the set of processing speed values for the edge set is further computed based on a workload associated with the edge set.

To this end, in some optional embodiments, one or more of the foregoing features of the aforementioned apparatus, system and/or method may, allocate sub-graphs of a graph to a plurality of heterogeneous processing resources for execution with improved energy efficiency. Edge sets of the graph may be allocated to minimize the overall execution time while also minimizing power consumption based on a value of an energy parameter.

This may, in turn, result in power consumption reductions and/or execution speed increases that would otherwise be foregone in systems that lack such allocation mechanisms. It should be noted that the aforementioned potential advantages are set forth for illustrative purposes only and should not be construed as limiting in any manner.

BRIEF DESCRIPTION OF THE DRAWINGS

FIG. 5B illustrates the edge sets of the matrix access pattern that can be processed in parallel, in accordance with one embodiment.

FIG. 5C illustrates an allocation matrix representation of the bipartite graph, in accordance with one embodiment.

DETAILED DESCRIPTION

In one embodiment, a graph represented by vertices and edges may be divided into smaller portions (e.g. sub-graphs or sub-tasks) for parallel execution by multiple processing resources. In one embodiment, the multiple processing resources are heterogeneous processing resources that may differ in processing capacities, processing speeds, and/or in other characteristics. When processing a particular workload, the execution time and/or power consumption may be different for at least one of the heterogeneous processing resources. The multiple processing resources may each comprise the same core or processor and one or more of the cores or processors may be configured to operate at a different frequency or voltage supply level, so that the processing resources are heterogeneous.

Sub-graphs that may be processed in parallel are identified and are allocated to at least one of the processing resources to minimize the energy consumption and execution time. The energy consumption and execution time for processing each sub-graph may be balanced according to an energy parameter. A user or operator may select the energy parameter in some examples. The energy parameter specifies a performance versus energy efficiency for one or more heterogeneous processing resources being used in processing a graph. In some embodiments, the energy parameter specifies a performance versus energy efficiency for all heterogeneous processing resources being used in processing a graph.

More illustrative information will now be set forth regarding various optional architectures and uses in which the foregoing technique may or may not be implemented, in accordance with other embodiments. It should be strongly noted that the following information is set forth for illustrative purposes and should not be construed as limiting in any manner. Any of the following features may be optionally incorporated with or without other features described.

Figure 1A:
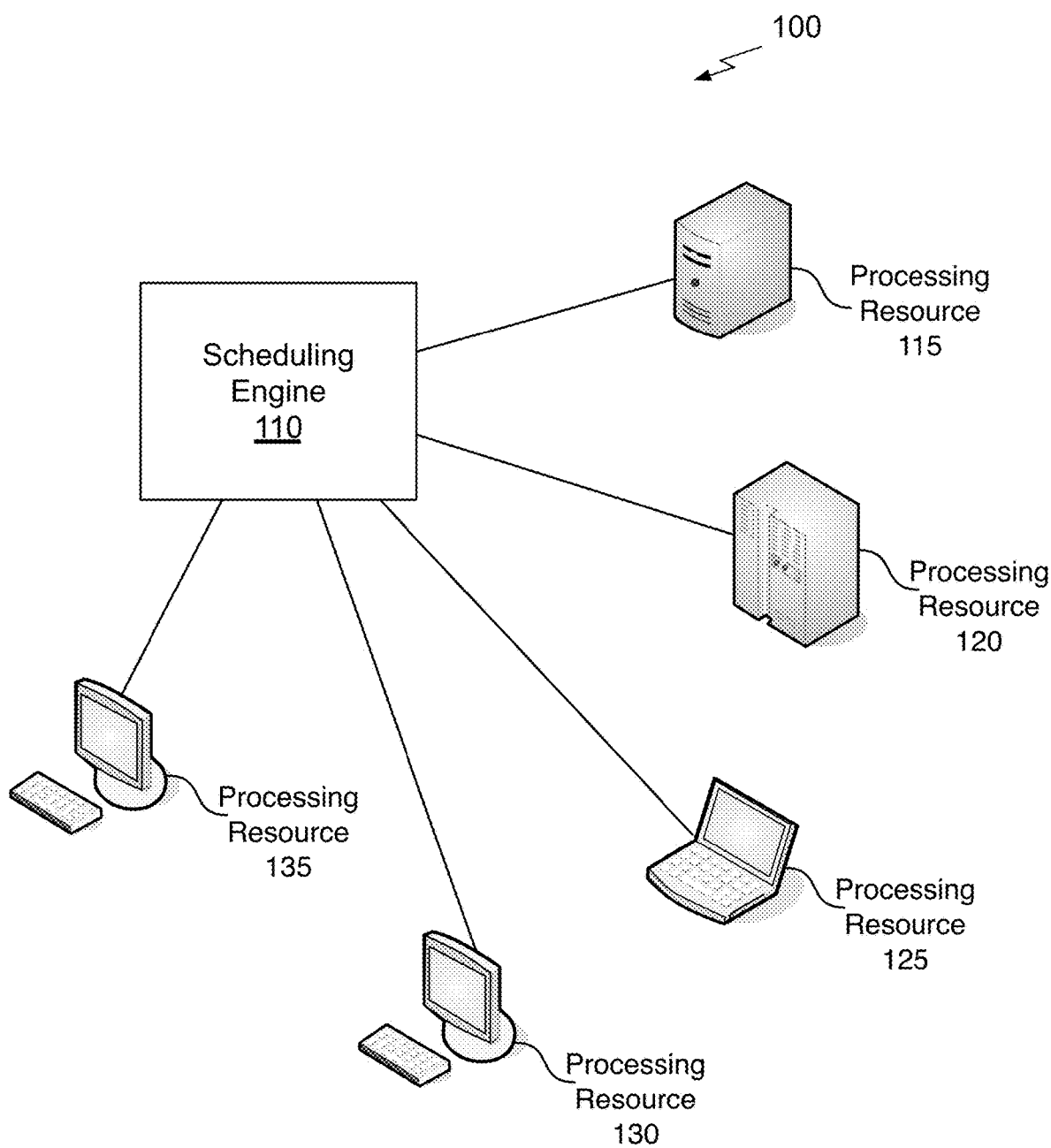
FIG. 1A illustrates a graph computing system, in accordance with one embodiment.

FIG. 1A illustrates a graph computing system 100, in accordance with one embodiment. The graph computing system 100 includes a scheduling engine 110 and two or more heterogeneous processing resources 115, 120, 125, 130, and 135. In other embodiments, fewer or more processing resources may be included in the graph computing system 100. In the context of the present graph computing system 100, the scheduling engine 110 may take any form including, but not limited to executable instructions stored in a computer readable medium for use by or in connection with an instruction execution machine, apparatus, or device, such as a computer-based or processor-containing machine, apparatus, or device. In one embodiment, the scheduling engine 110 may be implemented as logic and/or circuitry configured to perform the operations of the executable instructions. As an option, the scheduling engine 110 may be implemented in the context of any one or more of the embodiments set forth in any subsequent figure(s) and/or description thereof. However, it is to be appreciated that the scheduling engine 110 may be implemented in the context of any desired environment.

The heterogeneous processing resources 115, 120, 125, 130, and 135 include processors and processing cores that may have different architectures, operate at different speeds, employ dynamic voltage and frequency scaling, be fabricated in different processes, and have varying power consumption, for example. The heterogeneous processing resources 115, 120, 125, 130, and 135 may be communicatively coupled to the scheduling engine 110 via a wired or wireless network. The heterogeneous processing resources 115, 120, 125, 130, and 135 may each be included within one or more computing devices such as a data server, desktop computer, lap-top computer, and/or any other type of logic. In one embodiment, the scheduling engine 110 assigns processing tasks, represented as sub-graphs of a graph computation, to one or more of the heterogeneous processing resources 115, 120, 125, 130, and 135, balancing execution time and energy consumption based on an energy parameter $\alpha$. The energy parameter $\alpha$ may be used to control the balance between execution time and energy consumption for executing a graph computation or for sub-graphs of the graph computation. A value of the energy parameter $\alpha$ may be defined to minimize execution time, to minimize energy consumption, or to achieve a specific balance between minimizing the execution time and minimizing the energy consumption for the graph computation. For example, a datacenter operator may specify a first energy parameter $\alpha_1$ for a first processing job to minimize energy consumption for a customer desiring to reduce cost and may specify a second energy parameter $\alpha_2$ for a second processing job to minimize execution time for a customer requiring high performance.

Figure 1B:
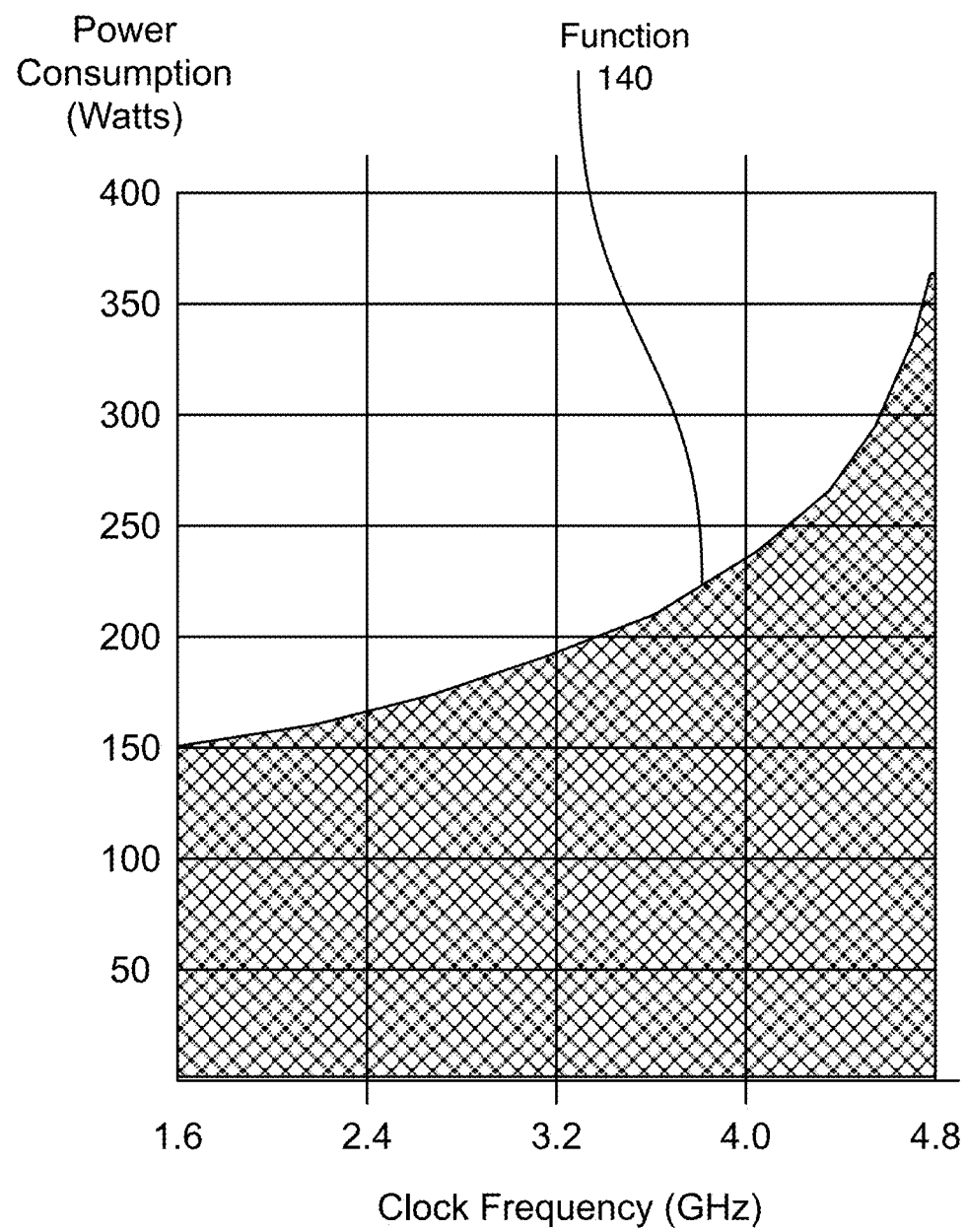
FIG. 1B illustrates a function representing a relationship between power consumption and clock frequency for a particular processing resource, in accordance with one embodiment.

FIG. 1B is a graph that illustrates a function 140 defining a relationship between speed and power consumption for a particular processing resource, in accordance with one embodiment. It can be seen from the graph that when operated at a lower speed (such as a 1.6 GHz clock frequency), the processing resource consumes less power. For example, as shown in FIG. 1B, when operated at 3.2 GHz the power consumption is 180 Watts. As the speed increases, the power consumption may vary non-linearly according to the function 140. Operating the processor at a higher clock frequency to reduce execution time results in a higher power consumption compared with operating the processor at a lower clock frequency. As the operating frequency increases beyond 3.2 GHz, the amount by which the power consumption increases becomes even greater with the slope of the function 140 increasing with increasing clock frequency. The function 140 represents an operating characteristic of the particular heterogeneous processing resource, substantially representing the relationship between speed (e.g., clock frequency) and power consumption. Generally, the speed of the processing resource correlates with execution time for a processing task.

The power consumption is the result of several different components. The relationship between speed and power consumption differs for different processors. For the particular processor characterized by the relationship shown in FIG. 1B, the system component (at the interfaces or external to the processor) of the power consumption is relatively constant regardless of the operating speed. Generally, the static component of the power consumption (i.e., the power consumed when transistors are not switching) increases slightly as the operating speed increases, while the short-circuit component of the power consumption increases nearly linearly as the operating speed increases. The transition (switching) component of the power consumption increases non-linearly as the operating speed increases.

Green computing techniques seek to reduce or limit energy consumption. Because energy is computed as the product of power consumption and execution time, the operating speed may be reduced to minimize the energy consumption of a processor or processors of a heterogeneous processing resource. However, when a minimum performance level is needed, the operating speed reduction is limited by a minimum execution time.

An operating characteristic $\beta$ may be measured for each one of the heterogeneous processing resources 115, 120, 125, 130, and 135. The operating characteristic $\beta$ may have a different value for each one of the heterogeneous processing resources 115, 120, 125, 130, and 135. In one embodiment, the energy consumption at a particular speed (i.e., at a particular processing resource clock frequency) s is $s^\beta$, where $\beta$ is the operating characteristic and $\beta>1$.

Figure 1C:
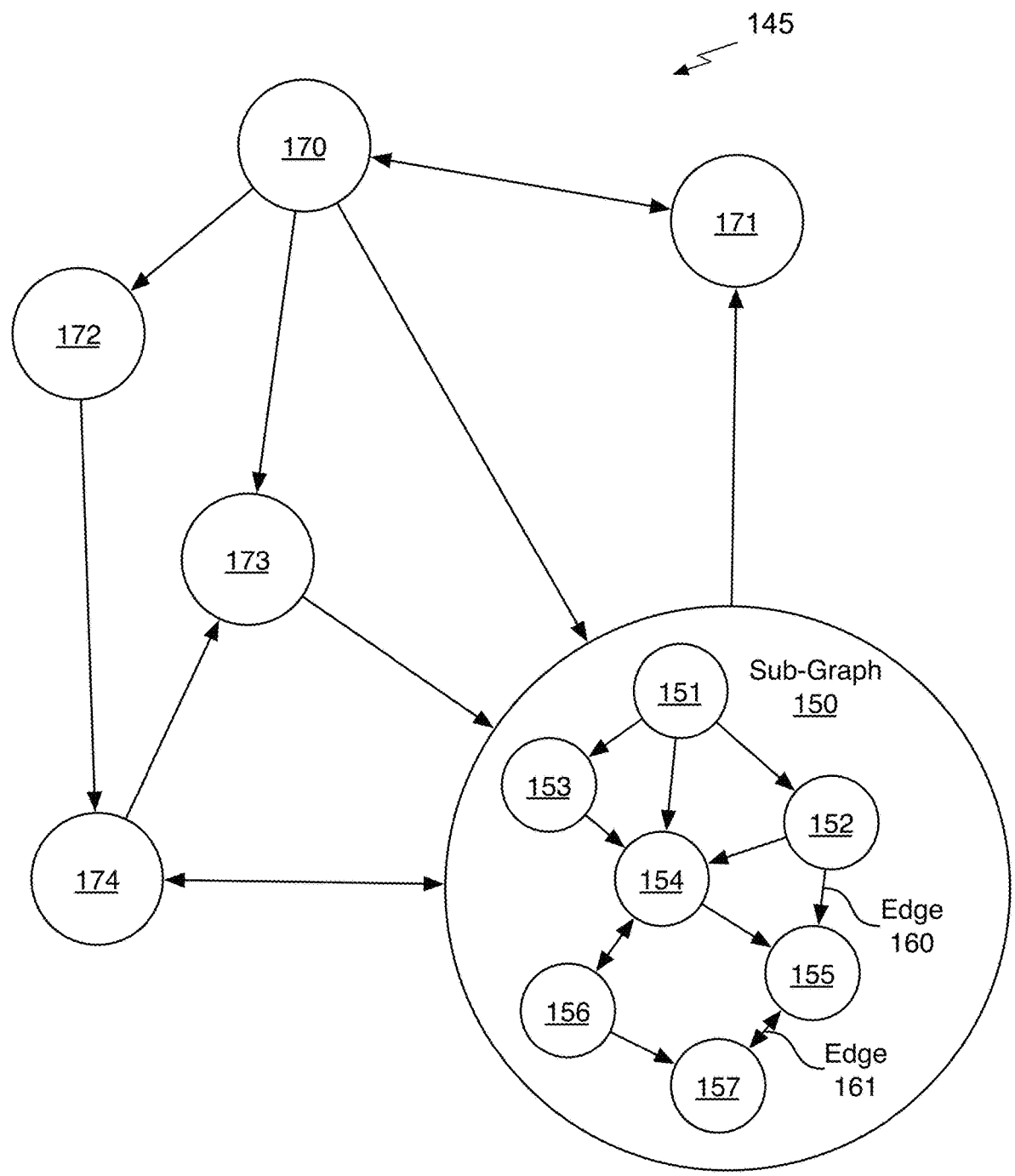
FIG. 1C illustrates a graph including sub-graphs scheduled for execution on heterogeneous platforms based on energy efficiency, in accordance with one embodiment.

FIG. 1C illustrates a graph 145 including sub-graphs 170, 171, 172, 173, 174, and 150 that are scheduled for execution on heterogeneous platforms based on energy efficiency, in accordance with one embodiment. The sub-graph 150 includes the vertices 151, 152, 153, 154, 155, 156, and 157 in the example shown. Each vertex may be a source and/or destination vertex, depending on a directionality of an edge originating or terminating at the vertex. As shown in FIG. 1C, an edge 160 connects the source vertex 152 to the destination vertex 155. An edge 161 connects the source vertex 157 to the destination vertex 155 and likewise connects the source vertex 155 to the destination vertex 157 (i.e., the edge 161 has a bi-directional property). In one embodiment, the edge 161 may be split into two separate edges with a first edge connecting the source vertex 157 to the destination vertex 155 and a second edge connecting the source vertex 155 to the destination vertex 157.

Each of the sub-graphs represents a computing task that may be allocated, by the scheduling engine 110, to a processing resource for execution. In one embodiment, the processing workload represented by a particular sub-graph may be quantified as a number of edges to be processed. Graph processing algorithms typically execute a sub-graph in multiple iterations, and the number of edges to be processed for a sub-graph during an iteration i is $m_i$. Therefore, $m_i$ is the workload to be executed for a sub-graph during an execution iteration of a graph-processing algorithm. In one embodiment, rather than representing the operating (i.e., clock) frequency of a processor, the speed s may instead represent a number of instructions (or edges) processed per second.

Based on the operating characteristics (i.e., values of $\beta$) for the heterogeneous processing resources, an optimal speed s may be computed for execution of a set of edges (i.e., a sub-graph) for a given value of the (selected) energy parameter $\alpha$. In one example embodiment, assume that $\alpha=1$ minimizes energy consumption and $\alpha=0$ minimizes execution time. When the energy parameter $\alpha$ is set to minimize execution time (e.g., $\alpha=0$), the optimal speed is a fastest speed in the set of computed speed values for the edge set. Otherwise, the optimal speed is a value that achieves the balance between the execution time and the energy consumption. A function $f(s)$ balances energy consumption with execution time based on $\alpha$. The energy consumption is represented as $s^\beta$ and the execution time is represented as $m_i/s$.

$$f(s) = \alpha s^\beta + (1-\alpha)\frac{m_i}{s} \quad (1)$$

The derivative of $f(s)$, $f'(s)$ is set to zero to determine the value of the speed s that results in the minimum of the sum of the energy consumption and the execution time for processing the workload (i.e., to determine a minimum of $f(s)$):

$$f'(s) = \alpha\beta s^{\beta-1} - (1-\alpha)\frac{m_i}{s^2} = 0 \quad (2)$$

The speed s* for a particular operating characteristic, workload, and energy parameter is computed as:

$$s^* = \sqrt[\beta+1]{\frac{(1-\alpha)m_i}{\alpha\beta}}$$

A set of processing speed values may be computed for an edge set that includes one speed value for each heterogeneous processing resource. Note that when two heterogeneous processing resources have equal operating characteristic values, the same processing speed value will be computed for the two heterogeneous processing resources. In one embodiment, each processing resource of a plurality of heterogeneous processing resources is associated with a different value of the operating characteristic. An optimal processing speed value may be identified from the set of processing speed values. In one embodiment, when the speed value is an operating clock frequency, the optimal processing speed value is the lowest speed value in the set of processing speed values so that the energy consumption is minimized. In one embodiment, when the speed value represents a number of edges processed per second, the optimal processing speed value is the highest speed value in the set of processing speed values so that the execution time is minimized. The scheduling engine 110 may allocate the workload to the processing resource associated with the optimal processing speed value.

Figure 2A:
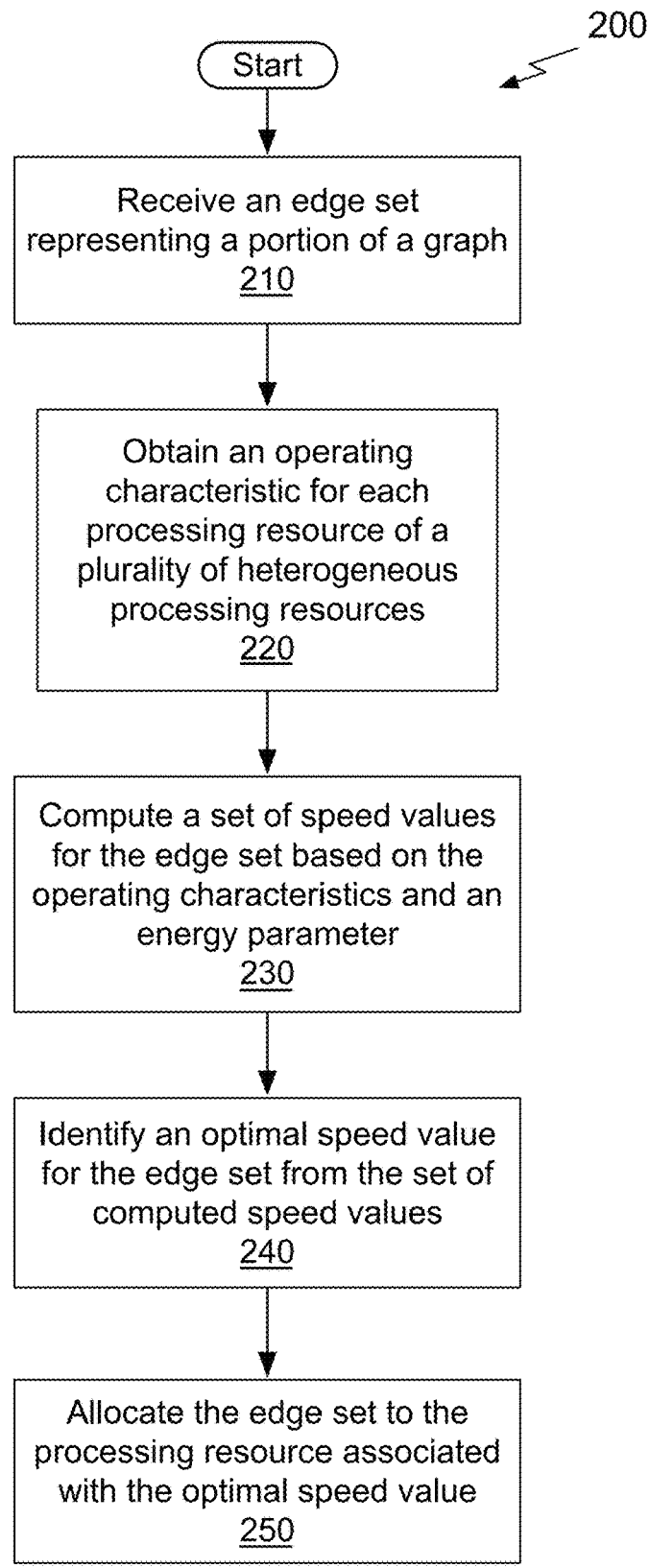
FIG. 2A is a flowchart of a method for scheduling graph computing on heterogeneous platforms based on energy efficiency, in accordance with one embodiment.

FIG. 2A is a flowchart of a method 200 for scheduling graph computing on heterogeneous platforms based on energy efficiency, in accordance with one embodiment. As an option, the method 200 may be implemented in the context of any one or more of the embodiments set forth in any previous and/or subsequent figure(s) and/or description thereof. For example, the method 200 may be implemented for scheduling graph processing in the context of the graph computing system 100 of FIG. 1A or any other embodiment. Although the steps shown in FIG. 2A are described in the context of a program executed by a processor, the steps shown in FIG. 2A may also be performed by custom circuitry or by a combination of custom circuitry and a program.

At step 210, the scheduling engine 110 receives an edge set representing a sub-graph or other portion of a graph. At step 220, the scheduling engine 110 obtains an operating characteristic for each available processing resource of a plurality of heterogeneous processing resources. For example, the scheduling engine 110 may obtain an operating characteristic for the heterogeneous processing resources 115, 120, 125, 130, and 135 shown in FIG. 1A.

At step 230, the scheduling engine 110 computes a set of processing speed values for the edge set based on the operating characteristics and an energy parameter. Each processing speed value corresponds to a combination of the edge set and a selected, different (i.e., unique) processing resource of the plurality of heterogeneous processing resources. For example, the scheduling engine 110 may compute a set of processing speed values for the heterogeneous processing resources 115, 120, 125, 130, and 135 shown in FIG. 1A. In one embodiment, the set of processing speed values is computed based on, for example, the operating characteristics, a workload of the edge set, and the energy parameter.

In one embodiment, data needed to execute the edge set is not available to one or more processing resources, and as a result, processing speed values corresponding to the one or more processing resources are not computed. The scheduling engine 110 may not allocate the edge set to the one or more processing resources for execution because the data needed to execute the edge set is not available to the one or more processing resources. The data may not be available because the data cannot be accessed (e.g., read and/or written) by the particular processing resource.

At step 240, the scheduling engine 110 identifies an optimal processing speed value from the set of computed speed values. At step 250, the scheduling engine 110 allocates the edge set to the processing resource associated with the optimal processing speed value. Thus, the processing resource associated with the optimal processing speed value will execute the edge set.

When a graph is sub-divided into multiple sub-graphs, with each sub-graph including an edge set, then two or more of the edge sets may be executed in parallel. However, it may not be possible to allocate each edge set to a processing resource associated with the optimal speed that is identified for the edge set. Therefore, several different allocations may be compared to determine a final allocation that minimizes power consumption and minimizes execution time for the edge set. The scheduling engine 110 may iteratively allocate the edge sets to the processing resources to determine the final allocation.

Figure 2B:
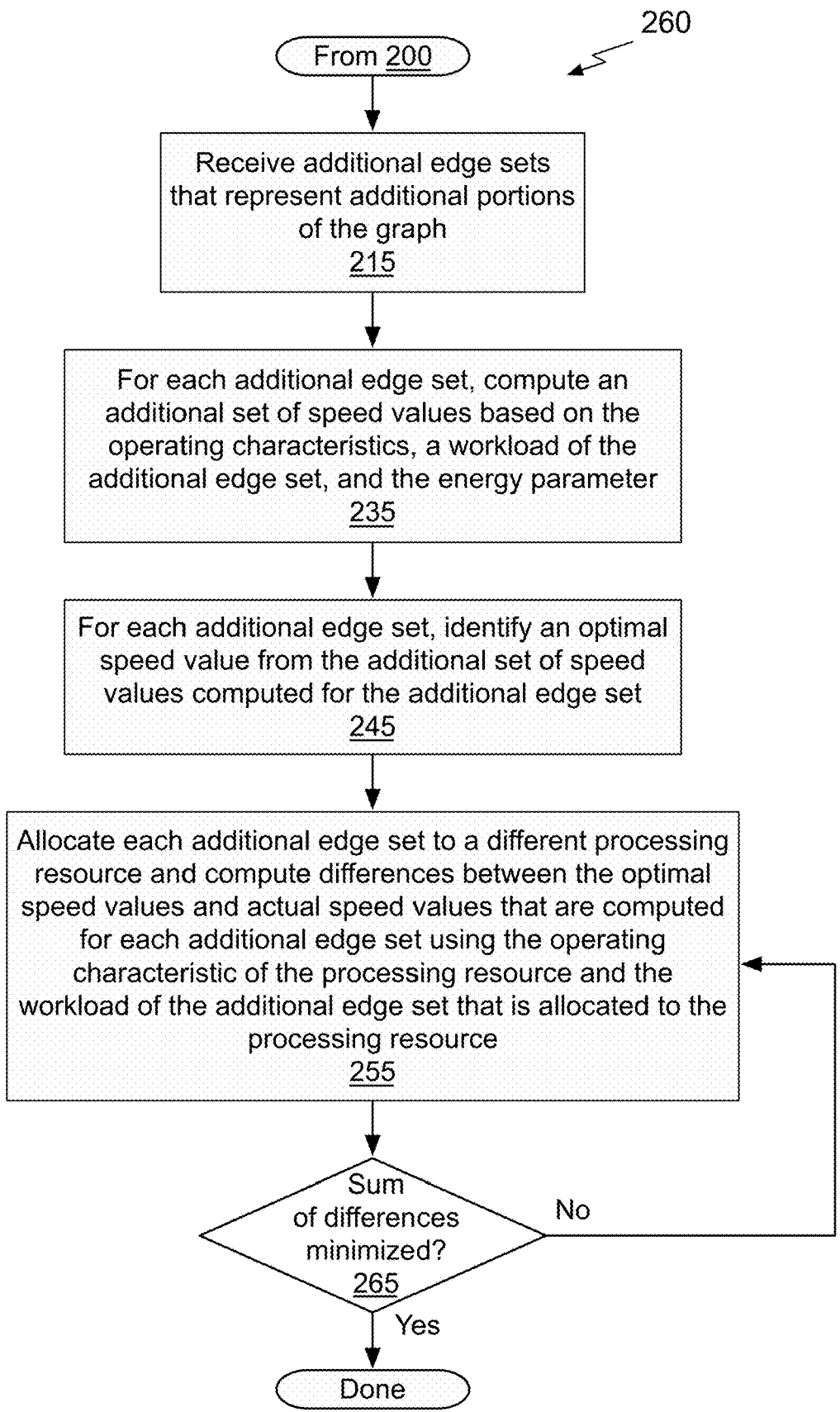
FIG. 2B is a flowchart of another method for scheduling graph computing on heterogeneous platforms based on energy efficiency, in accordance with one embodiment.

FIG. 2B is a flowchart of another method 260 for scheduling graph computing on heterogeneous platforms based on energy efficiency, in accordance with one embodiment. As an option, the method 260 may be implemented in the context of any one or more of the embodiments set forth in any previous and/or subsequent figure(s) and/or description thereof. For example, the method 260 may be implemented for scheduling graph processing in the context of the graph computing system 100 of FIG. 1A or any other embodiment. Although the steps shown in FIG. 2B are described in the context of a program executed by a processor, the steps shown in FIG. 2B may also be performed by custom circuitry or by a combination of custom circuitry and a program.

One or more of the steps of method 200 may be completed in parallel with the steps of the method 260. At step 215, the scheduling engine 110 receives additional edge sets representing additional portions of the graph. At step 235, the scheduling engine 110 computes an additional set of processing speed values for each additional edge set. Each additional set of processing speed values is computed based on, for example, the operating characteristics, a workload of the additional edge set, and the energy parameter. In one embodiment, one value of the energy parameter is used for all of the edge sets of a graph. In another embodiment, different values may be specified for the energy parameter for one or more edge sets of the graph.

In one embodiment, data needed to execute an additional edge set is not available to one or more processing resources and speed values associated with the one or more processing resources are not computed. Therefore, the scheduling engine 110 may not allocate the additional edge set for execution to the one or more processing resources for which the data is not available.

At step 245, for each additional edge set, the scheduling engine 110 identifies an optimal processing speed value from the additional set of computed speed values. At step 255, the scheduling engine 110 allocates each additional edge set to a different processing resource and computes differences between the optimal processing speed values and actual processing speed values. The actual processing speed values are computed for each additional edge set using the operating characteristic of the processing resource and the workload of the additional edge set that is allocated to the processing resource. For each additional edge set, a difference between the optimal processing speed value and the actual processing speed value is computed. The differences are then summed to produce a sum of differences for the allocation iteration.

At step 265, the scheduling engine 110 determines if the sum of differences is minimized, and, if so, the final allocation is determined. The final allocation may be determined to be an allocation of a previous iteration or may be the current iteration. In one embodiment, the scheduling engine 110 may determine that the sum of differences is minimized after a threshold number of iterations have been completed or when the sum of differences falls below a threshold value. If, at step 265, the scheduling engine 110 determines that the sum of differences is not minimized, then the scheduling engine 110 returns to step 255 to perform another allocation iteration.

Figures 3A, 3B:
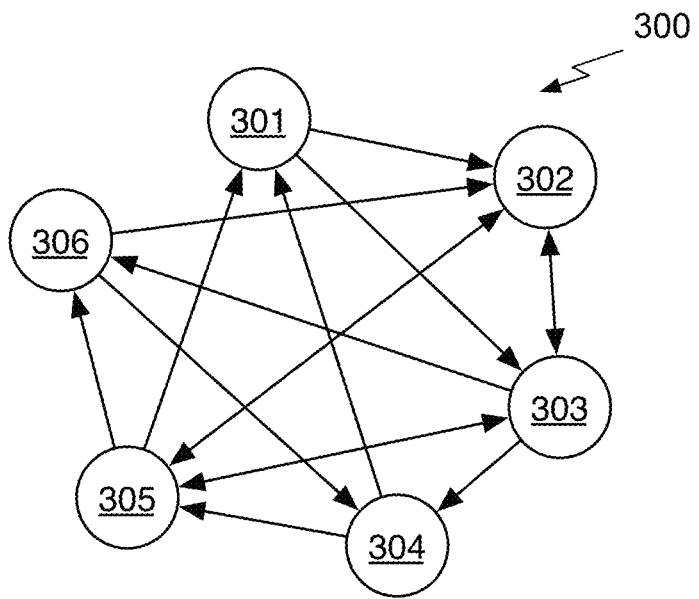
FIG. 3A illustrates a sub-graph including vertices connected by edges, in accordance with one embodiment.
FIG. 3B illustrates the edges of the sub-graph shown in FIG. 3A sorted into shards listing edge values, in accordance with one embodiment.

FIG. 3A illustrates a sub-graph 300 including vertices 301, 302, 303, 304, 305, and 306 connected by edges, in accordance with one embodiment. The methods 200 and 260 may be used to allocate processing resources to edge sets for a unified graph computing model. Many graph computing algorithms are based on a gather, apply, scatter (GAS) algorithm that is included in the unified graph computing model. The GAS algorithm first partitions a graph into sub-graphs and then iteratively performs gather, apply, and scatter operations. During the gather operations, messages are received from parent vertices and neighboring vertices and the messages are merged. During the apply operations, attributes of the vertex are updated based on the merged messages. During the scatter operations, the updated attributes are broadcast to child vertices and neighboring vertices. Other graph processing algorithms that are also included in the unified graph computing model and that may benefit from the allocation of heterogeneous processing resources using the methods 200 and 260 are GraphLab and Graph™. Additional graph processing algorithms that are also included in the unified graph computing model are PageRank™ and SSSP.

FIG. 3B illustrates the edges of the sub-graph 300 shown in FIG. 3A sorted into shards 310, 315, and 320, each listing edge values, in accordance with one embodiment. In one embodiment, the edge value for a particular edge represents a processing workload for the edge. The shard 310 includes edges having either the vertex 301 or 302 as a destination vertex. The shard 315 includes edges having either the vertex 303 or 304 as a destination vertex. The shard 320 includes edges having either the vertex 305 or 306 as a destination vertex.

Figure 4:
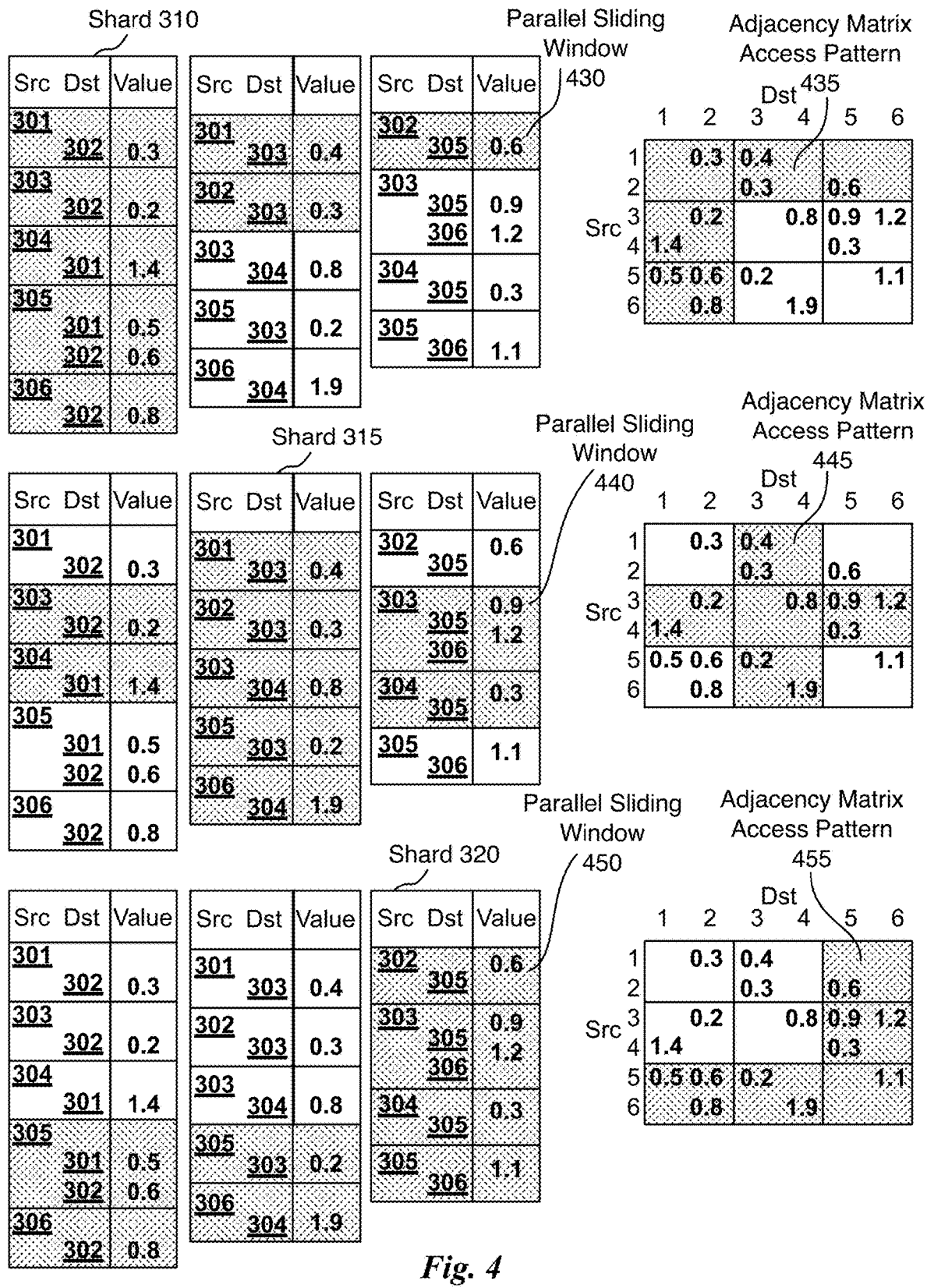
FIG. 4 illustrates parallel sliding window access patterns for processing the shards shown in FIG. 3B and the access patterns mapped to an adjacency matrix, in accordance with one embodiment.

FIG. 4 illustrates parallel sliding window access patterns for processing the shards shown in FIG. 3B and a mapping of the access patterns to an adjacency matrix, in accordance with one embodiment. The scheduling engine 110 may be configured to group the edge sets within the shards 310, 315, and 320 for execution in parallel. A parallel sliding window 430 includes the edges within the shards 310, 315, and 320 that are shaded. The edges in the parallel sliding window 430 are a first edge set and the edges in the first edge set are allocated to two or more heterogeneous processing resources for parallel execution during a first execution step by the scheduling engine 110. Note that all of the edges in the shard 310 are included in the parallel sliding window 430 for execution during the first execution step.

A parallel sliding window 440 includes the edges within the shards 310, 315, and 320 that are shaded. The edges in the parallel sliding window 440 are a second edge set and the edges in the second edge set are allocated to two or more heterogeneous processing resources for parallel execution during a second execution step by the scheduling engine 110. Note that all of the edges in the shard 315 are included in the parallel sliding window 440 for execution during the second execution step. Some of the edges in the shard 310 are executed again during the second execution step because the data produced for those edges is needed during the second execution step.

A parallel sliding window 450 includes the edges within the shards 310, 315, and 320 that are shaded. The edges in the parallel sliding window 450 are a third edge set and the edges in the third edge set are allocated to two or more heterogeneous processing resources for parallel execution during a third execution step by the scheduling engine 110. Note that all of the edges in the shard 320 are included in the parallel sliding window 450 and execution during the third execution step. Some of the edges in the shards 310 and 315 are executed again during the second execution step because the data produced for those edges is needed during the second execution step.

The edge sets shown in the parallel sliding windows 430, 440, and 450 may be organized in an adjacency matrix form where the source vertices are the rows of the matrix and the columns of the matrix are the destination vertices. Within the adjacency matrix, the access patterns move downward row-by-row and to the right column-by-column for each execution step.

In one embodiment, the mapping of the edges into the adjacency matrix pattern may be modified to balance the workloads across the adjacency matrix or to concentrate the workloads into particular cells of the adjacency matrix such as along a diagonal. The mapping may be changed by simply modifying the vertex identifier to reposition edges connecting to the vertex as either a source or destination within the adjacency matrix. For example, the identifiers for vertex 301 and 304 may be swapped to change the mapping of the edges to cells of the adjacency matrix. Importantly, the topology of the graph 300 is not altered, only the identifiers of vertices are modified and the position of corresponding edges in the adjacency matrix. Swapping the identifiers for vertex 301 with vertex 304 causes rows 1 and 4 to be swapped and causes columns 1 and 4 to be swapped in the adjacency matrix. Adjusting the workload by changing the mapping may be used to ensure that a total workload for a cell does not exceed the size of a cache or the bandwidth available to access the data corresponding to the workload. Adjusting the workload may also ensure that the total workload for each cell meets a minimum value to reduce scheduling overhead by concentrating the workloads into a smaller number of cells.

Organization of the edge sets to be executed in parallel during an execution step and the associated workloads in the adjacency matrix by the scheduling engine 110 prepares the edge sets for allocation to the plurality of heterogeneous processing resources. The scheduling engine 110 allocates the edge sets to the plurality of heterogeneous processing resources to balance energy consumption and execution speed as controlled by the energy parameter, as described further herein.

Figure 5A:
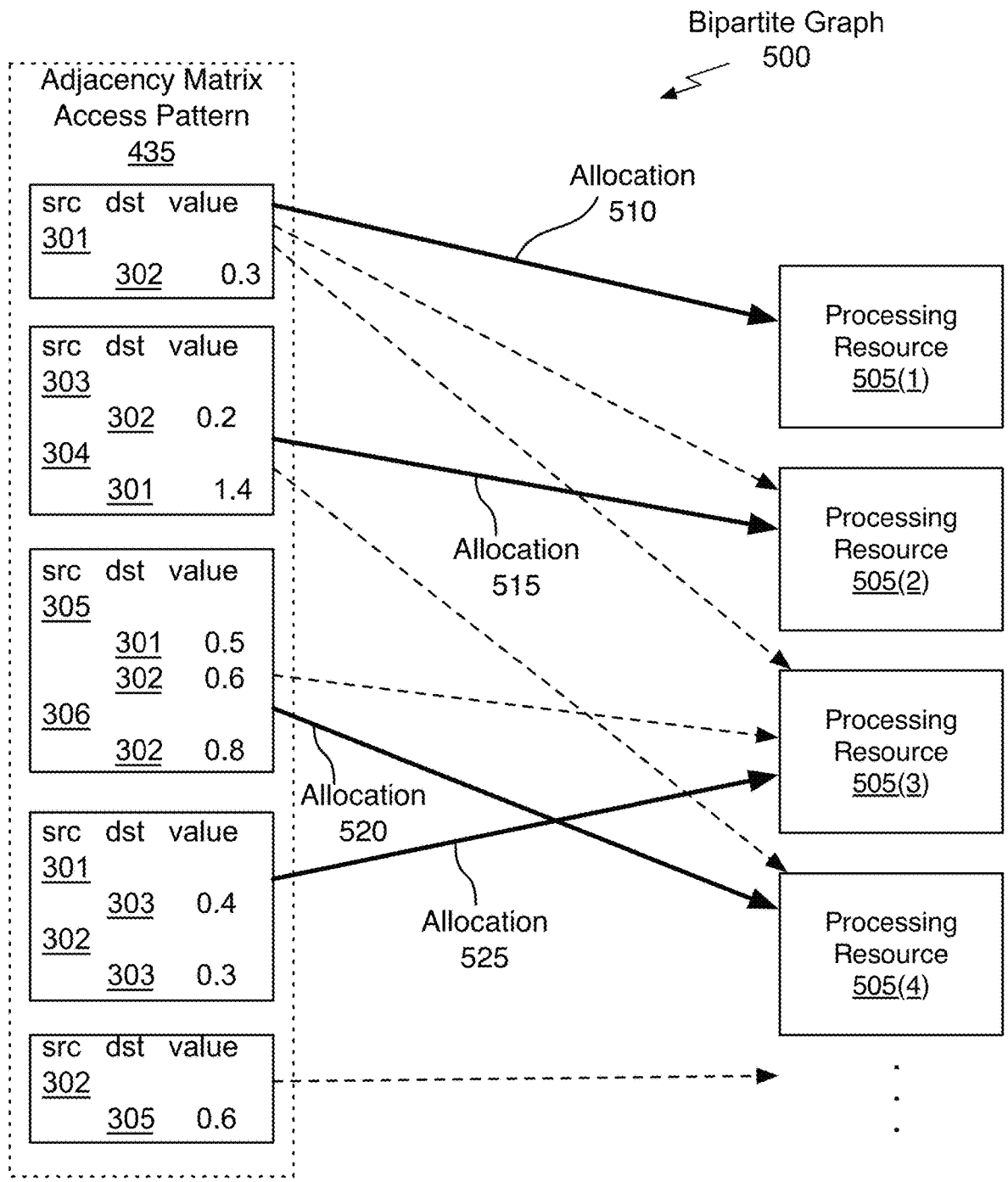
FIG. 5A illustrates allocation of the edge set for the matrix access pattern shown in FIG. 4 to processing resources, in accordance with one embodiment.

FIG. 5A illustrates a bipartite graph 500 representing allocation of the edge set for the adjacency matrix access pattern 435 to processing resources 505, in accordance with one embodiment. The data needed for executing the edge from source vertex 301 to destination vertex 302 is available to the processing resources 505(1), 505(2), and 505(3). The data needed for executing the edge from source vertex 303 to destination vertex 302 and the edge from source vertex 304 to destination vertex 301 is available to the processing resources 505(2) and 505(4). The data needed for executing the edges from source vertex 305 to destination vertices 301 and 302 and the edge from source vertex 306 to destination vertex 302 is available to the processing resources 505(3) and 505(4). The data needed for executing the edge from source vertex 301 to destination vertex 303 and the edge from source vertex 302 to destination vertex 303 is available to the processing resource 505(3).

When the allocation problem is represented as a bipartite graph 500, the edge sets that can be processed in parallel for an iteration i are allocated to processing resources j. The edge sets to be allocated and the processing resources are vertices. The edges of the bipartite graph 500 indicate the allocation. For example, the allocations 510, 515, 520, and 525 are the edges of the bipartite graph 500. The bipartite graph 500 may then be represented as a matrix having i rows and j columns to determine the allocation.

FIG. 5B illustrates the edge sets of the adjacency matrix access pattern 435 that can be processed in parallel, in accordance with one embodiment. In the shard 310, the edge sets 540, 545, 550 may be processed in parallel with the edge set 555 in the shard 315 and the edge set 560 in the shard 320.

FIG. 5C illustrates an allocation matrix 570 that represents the bipartite graph 500, in accordance with one embodiment. In the allocation matrix 570 each one of the edge sets is allocated to a different one of the processing resources. Note that only one edge set is present in any row i and in any column j to ensure that there are no conflicts where multiple edge sets are allocated to the same processing resource. The rows of the allocation matrix 570 may be reorganized as shown in an allocation matrix 575, so that the edge sets are on a diagonal of the matrix and the sum of the differences is minimized. The allocation problem can be modeled as a linear programming problem, specifically a max trace function:

$$\max_{X \in \mathcal{R}^{n \times m}} \text{tr}(A^T X) \quad (4)$$

A trace, tr is the sum of the diagonal of the matrix. A is the matrix, T is a transpose operation that is applied to reorganize the rows, X is a matrix where each entry is either a 0 or 1, and $\alpha a$ is the cost difference for an edge set i allocated to a particular processing resource j:

$$A = \{a_{ij}\}; a_{ij} = \quad (5)$$

The cost difference is a negative value computed by subtracting the actual processing speed value for a particular allocation from the optimal processing speed value. The cost differences should be minimized to produce the final allocation for the edge sets, such as the allocation matrix 575.

$$a_{ij} = f_{m_i}(s_{ij}^*) - f_{m_i}(s_j) \quad (6)$$

$$= \alpha \left( s_{ij}^{*\beta j} - s_j^{\beta j} \right) + (1-\alpha) m_i \left( \frac{1}{s_{ij}^*} - \frac{1}{s_j} \right)$$

The allocation of the edge sets that can be executed in parallel is completed for a plurality of edge sets and the gather and apply operations may be performed as each one of the edge sets is executed. The processes of allocating and executing may be performed repeatedly until all of the edge sets are processed.

Figure 6:
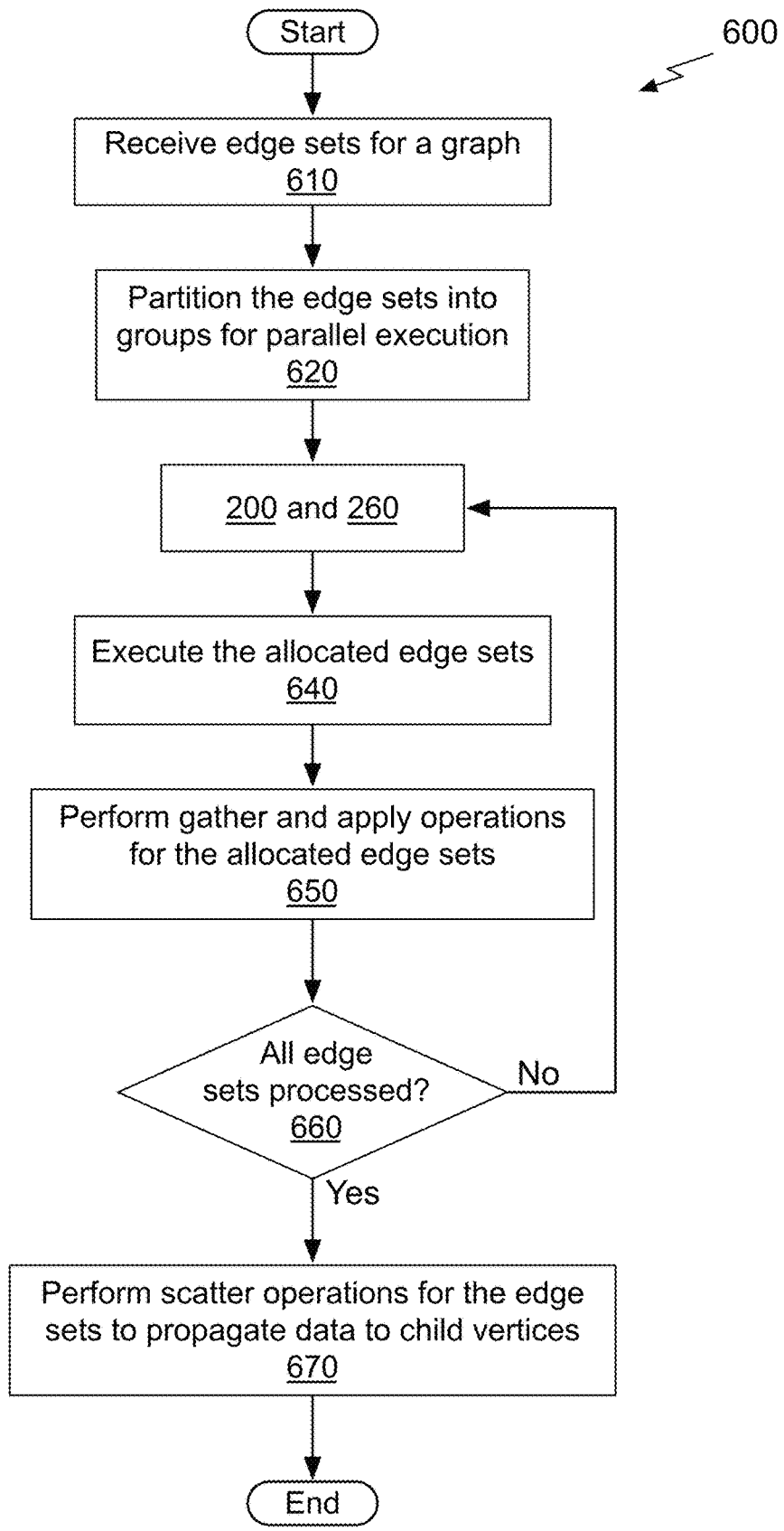
FIG. 6 is a flowchart of a method for scheduling and executing graph computing on heterogeneous platforms based on energy efficiency, in accordance with one embodiment.

FIG. 6 is a flowchart of another method 600 for scheduling graph computing on heterogeneous platforms based on energy efficiency, in accordance with one embodiment. As an option, the method 600 may be implemented in the context of any one or more of the embodiments set forth in any previous and/or subsequent figure(s) and/or description thereof. For example, the method 600 may be implemented for scheduling graph processing in the context of the graph computing system 100 of FIG. 1A or any other embodiment. Although the steps shown in FIG. 6 are described in the context of a program executed by a processor, the steps shown in FIG. 6 may also be performed by custom circuitry or by a combination of custom circuitry and a program.

At step 610, the scheduling engine 110 receives edge sets representing a graph. At step 620, the scheduling engine 110 partitions the edge sets into groups for parallel execution. The scheduling engine 110 then completes the methods 200 and 260 for one of the groups to allocate the edge sets in the group for execution by a plurality of heterogeneous processing resources.

At step 640, the allocated edge sets are executed by the plurality of heterogeneous processing resources. At step 650, the plurality of heterogeneous processing resources complete gather and apply operations for the allocated edge sets. At step 660, the scheduling engine 110 determines if all of the edge sets are processed, and, if not, the scheduling engine returns to steps 200 and 260 to allocate another group of edge sets for parallel execution by the plurality of heterogeneous processing resources. If, at step 660, the scheduling engine 110 determines that all of the edge sets are processed, then allocation of the edge sets is completed and the scheduling engine proceeds to step 670. At step 670, the plurality of heterogeneous processing resources performs scatter operations for the edge sets to propagate data to child vertices. In one embodiment, the scatter operations are performed row-by-row on the edge sets within the allocation matrix to complete execution of a graph processing algorithm.

Figure 7:
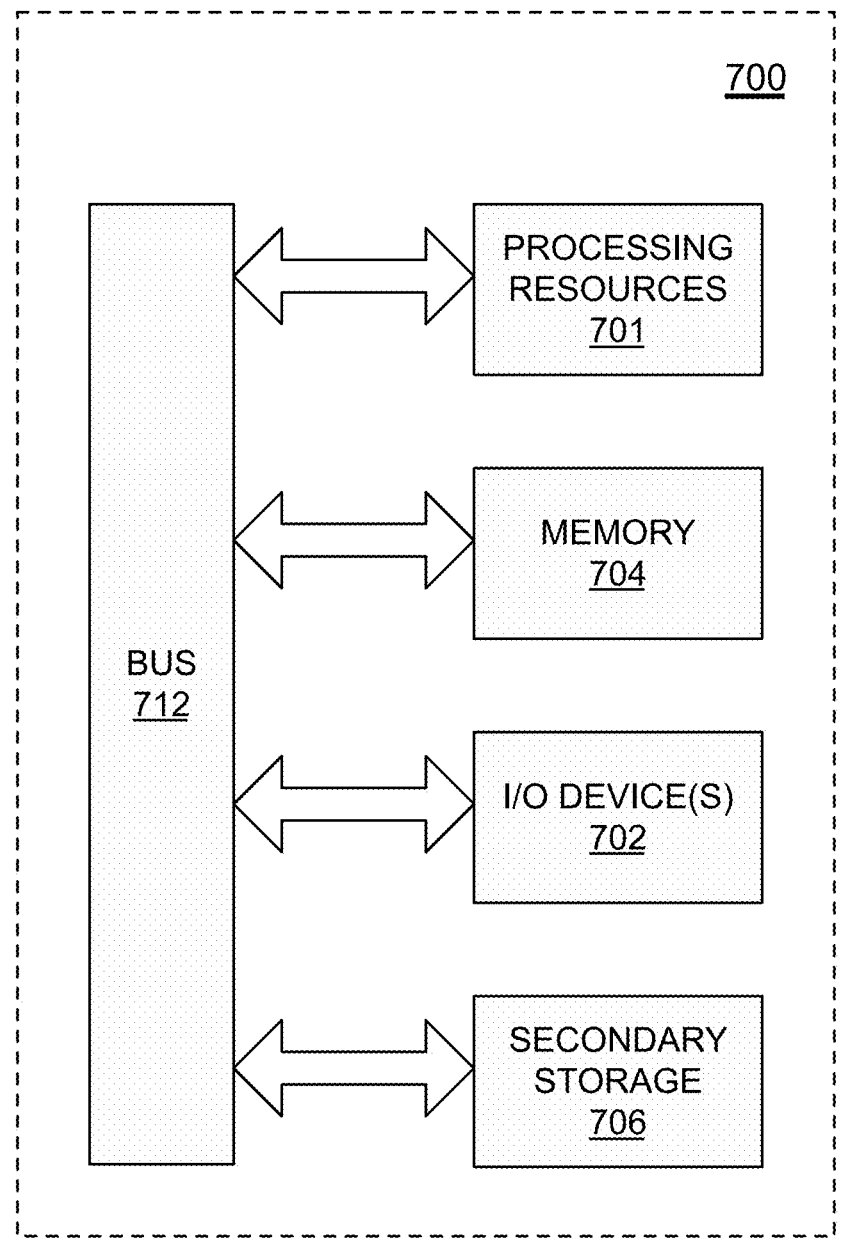
FIG. 7 illustrates an exemplary processing system, in accordance with one embodiment.

FIG. 7 illustrates an exemplary processing system 700, in accordance with one embodiment. As an option, the processing system 700 may be implemented in the context of any of the devices of the graph computing system 100 of FIG. 1A. Of course, the processing system 700 may be implemented in any desired environment.

As shown, a processing system 700 is provided including a plurality of heterogeneous processing resources 701 that are connected to a bus 712. Such heterogeneous processing resources 701 may be used in connection with a graph represented by vertices and edges which may be divided into smaller portions (e.g. sub-graphs or sub-tasks) for parallel execution. The processing system 700 also includes main memory 704 (e.g. random access memory (RAM), etc.). The processing system 700 may also include a secondary storage 706. The secondary storage 706 includes, for example, a hard disk drive and/or a removable storage drive, a floppy disk drive, a magnetic tape drive, a compact disk drive, etc. The removable storage drive reads from and/or writes to a removable storage unit in a well-known manner. The processing system 700 may also include input/output (I/O) device(s) 702. Output devices may include a conventional CRT (cathode ray tube), LCD (liquid crystal display), LED (light emitting diode), plasma display or the like. User input may be received from the I/O device(s) 702, e.g., keyboard, mouse, touchpad, microphone, gaze tracking, and the like.

Computer programs, or computer control logic algorithms, may be stored in the main memory 704, the secondary storage 706, and/or any other memory, for that matter. Such computer programs, when executed, enable the processing system 700 to perform various functions (as set forth above including, but not limited to those of a scheduling engine, for example). Memory 704, secondary storage 706 and/or any other storage are possible examples of tangible computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A scheduling engine, comprising:
   a non-transitory memory storage comprising instructions; and
   one or more processors in communication with the non-transitory memory storage, wherein the one or more processors execute the instructions to:
   receive an edge set that represents a portion of a graph comprising a plurality of vertices and a plurality of edges, the edge set including at least two of the plurality of vertices coupled by at least one of the plurality of edges, each vertex of the plurality of vertices representing a data object or a process, and each edge coupling two vertices of the plurality of vertices and representing a dependency relationship between the two vertices, wherein at least a second edge set represents a remaining portion of the graph, with the edge set and the at least second edge set being configurable for parallel execution;

obtain an operating characteristic for each processing resource of a plurality of heterogeneous processing resources, wherein the heterogeneous processing resources comprise a corresponding plurality of heterogeneous computing devices communicatively coupled with the scheduling engine, and the operating characteristic for a computing device of the plurality of heterogeneous computing devices defines a relationship between execution speed for executing the edge set by the computing device and power consumption for the computing device;

compute, based on the operating characteristics and an energy parameter, a set of processing speed values for the edge set, each speed value corresponding to a different processing resource of the plurality of heterogeneous processing resources for executing the edge set, wherein the energy parameter is a value between 0 and 1 that controls a balance between minimizing execution time for executing the edge set, when the energy parameter is 0, and minimizing energy consumption, when the energy parameter is 1 for executing the edge set; and identify an optimal processing speed value from the set of processing speed values for executing the edge set using one of the plurality of heterogeneous computing devices, the optimal processing speed value minimizing the energy consumption or the execution time as specified by the energy parameter.

2. The scheduling engine of claim 1, wherein the one or more processors execute the instructions to allocate the edge set to a processing resource of the plurality of heterogeneous processing resources for execution, the processing resource associated with the optimal processing speed value.

3. The scheduling engine of claim 2, wherein the one or more processors execute the instructions to determine the edge set is available to the processing resource associated with the optimal processing speed value before the edge set is allocated to the processing resource.

4. The scheduling engine of claim 1, wherein the one or more processors execute the instructions to:

receive additional edge sets that represent additional portions of the graph;

for each additional edge set, compute an additional set of processing speed values based on the operating characteristics, a workload associated with the additional edge set, and the energy parameter;

for each additional edge set, identify an optimal processing speed value from the additional set of processing speed values computed for the additional edge set; and perform parallel execution of the additional edge set and the edge set based on the optimal processing speed value.

5. The scheduling engine of claim 4, wherein the one or more processors execute the instructions to iteratively allocate each additional edge set to a different processing resource of the plurality of heterogeneous processing resources and produce a final allocation that minimizes differences between the optimal processing speed values and actual processing speed values, and each actual processing speed value is computed using the operating characteristic of the processing resource and the workload associated with the additional edge set that is allocated to the processing resource.

6. The scheduling engine of claim 5, wherein differences between the optimal processing speed value and the actual processing speed value for each of the additional edge sets are summed to produce a sum of differences, and the sum of differences for the final allocation is less than a sum of differences for any other allocation.

7. The scheduling engine of claim 5, further comprising processing, by the plurality of heterogeneous processing resources, the edge set and the additional edge sets in parallel according to the final allocation.

8. The scheduling engine of claim 5, wherein the additional edge sets and the plurality of heterogeneous processing resources are organized as a bipartite graph to produce the final allocation.

9. The scheduling engine of claim 1, wherein the power consumption for each computing device of the plurality of heterogeneous computing devices is $s^\beta$, where s is the execution speed of a central processing unit (CPU) for the computing device and $\beta$ is the operating characteristic defining a relationship between the execution speed for executing the edge set and the power consumption for the computing device.

10. The scheduling engine of claim 1, wherein the optimal processing speed value is a fastest processing speed in the set of processing speed values for the edge set.

11. The scheduling engine of claim 1, wherein the set of processing speed values for the edge set is further computed based on a workload associated with the edge set.

12. A graph computation system, comprising:

a plurality of heterogeneous processing resources comprising a corresponding plurality of heterogeneous computing devices; and a scheduling engine in communication with the plurality of heterogeneous processing resources, the scheduling engine configured to:

receive an edge set that represents a portion of a graph comprising a plurality of vertices and a plurality of edges, the edge set including at least two of the plurality of vertices coupled by at least one of the plurality of edges, each vertex of the plurality of vertices representing a data object or a process, and each edge coupling two vertices of the plurality of vertices and representing a dependency relationship between the two vertices, wherein at least a second edge set represents a remaining portion of the graph, with the edge set and the at least second edge set being configurable for parallel execution;

obtain an operating characteristic for each processing resource of the plurality of heterogeneous processing resources, wherein the operating characteristic for a computing device of the plurality of heterogeneous computing devices defines a relationship between execution speed for executing the edge set by the computing device and power consumption for the computing device;

compute, based on the operating characteristics and an energy parameter, a set of processing speed values for the edge set, each speed value corresponding to a different processing resource of the plurality of heterogeneous processing resources for executing the edge set, wherein the energy parameter is a value between 0 and 1 that controls a balance between minimizing execution time for executing the edge set, when the energy parameter is 0, and minimizing energy consumption, when the energy parameter is 1 for executing the edge set; and identify an optimal processing speed value from the set of processing speed values for executing the edge set using one of the plurality of heterogeneous computing devices, the optimal processing speed value minimizing the energy consumption or the execution time as specified by the energy parameter.

13. The graph computation system of claim 12, wherein the scheduling engine is further configured to:

receive additional edge sets that represent additional portions of the graph;

for each additional edge set, compute an additional set of processing speed values based on the operating characteristics, a workload associated with the additional edge set, and the energy parameter; and for each additional edge set, identify an optimal processing speed value from the additional set of processing speed values computed for the additional edge set.

14. The graph computation system of claim 12, wherein the power consumption for each computing device of the plurality of heterogeneous computing devices is $s^\beta$, where s is the execution speed of a central processing unit (CPU) for the computing device and $\beta$ is the operating characteristic.

15. A method, comprising:

receiving, by one or more processors of a scheduling engine, an edge set that represents a portion of a graph comprising a plurality of vertices and a plurality of edges, the edge set including at least two of the plurality of vertices coupled by at least one of the plurality of edges, each vertex of the plurality of vertices representing a data object or a process, and each edge coupling two vertices of the plurality of vertices and representing a dependency relationship between the two vertices, wherein at least a second edge set represents a remaining portion of the graph, with the edge set and the at least second edge set being configurable for parallel execution;

obtaining, by the one or more processors of the scheduling engine, an operating characteristic for each processing resource of a plurality of heterogeneous processing resources, wherein the heterogeneous processing resources comprise a corresponding plurality of heterogeneous computing devices communicatively coupled with the scheduling engine, and wherein the operating characteristic for a computing device of the plurality of heterogeneous computing devices defines a relationship between execution speed for executing the edge set by the computing device and power consumption for the computing device;

computing, by the one or more processors of the scheduling engine and based on the operating characteristics and an energy parameter, a set of processing speed values for the edge set, each speed value corresponding to a different processing resource of the plurality of heterogeneous processing resources for executing the edge set, wherein the energy parameter is a value between 0 and 1 that controls a balance between minimizing execution time for executing the edge set, when the energy parameter is 0, and minimizing energy consumption, when the energy parameter is 1, for executing the edge set; and identifying, by the one or more processors of the scheduling engine, an optimal processing speed value from the set of processing speed values for executing the edge set using one of the plurality of heterogeneous computing devices, the optimal processing speed value minimizing the energy consumption or the execution time as specified by the energy parameter.

16. The method of claim 15, further comprising:

the one or more processors of the scheduling engine receiving additional edge sets that represent additional portions of the graph;

for each additional edge set, the one or more processors of the scheduling engine computes an additional set of processing speed values based on the operating characteristics, a workload associated with the additional edge set, and the energy parameter; and for each additional edge set, the one or more processors of the scheduling engine identifies an optimal processing speed value from the additional set of processing speed values computed for the additional edge set.

17. The method of claim 16, further comprising:

the one or more processors of the scheduling engine allocating each additional edge set to a different processing resource of the plurality of heterogeneous processing resources and producing a final allocation that minimizes differences between the optimal processing speed values and actual processing speed values, and each actual processing speed value is computed using the operating characteristic of the processing resource and the workload associated with the additional edge set that is allocated to the processing resource.

18. A non-transitory computer-readable media storing computer instructions, that when executed by one or more processors, cause the one or more processors to perform the steps of:

receiving an edge set that represents a portion of a graph comprising a plurality of vertices and a plurality of edges, the edge set including at least two of the plurality of vertices coupled by at least one of the plurality of edges, each vertex of the plurality of vertices representing a data object or a process, and each edge coupling two vertices of the plurality of vertices and representing a dependency relationship between the two vertices, wherein at least a second edge set represents a remaining portion of the graph, with the edge set and the at least second edge set being configurable for parallel execution;

obtaining an operating characteristic for each processing resource of a plurality of heterogeneous processing resources, wherein the heterogeneous processing resources comprise a corresponding plurality of heterogeneous computing devices communicatively coupled with a scheduling engine, and the operating characteristic for a computing device of the plurality of heterogeneous computing devices defines a relationship between execution speed for executing the edge set by the computing device and power consumption for the computing device;

computing, based on the operating characteristics and an energy parameter, a set of processing speed values for the edge set, each speed value corresponding to a different processing resource of the plurality of heterogeneous processing resources for executing the edge set, wherein the energy parameter is a value between 0 and 1 that controls a balance between minimizing execution time for executing the edge set, when the energy parameter is 0, and minimizing energy consumption, when the energy parameter is 1, for executing the edge set; and identifying an optimal processing speed value from the set of processing speed values for executing the edge set using one of the plurality of heterogeneous computing devices, the optimal processing speed value minimizing the energy consumption or the execution time as specified by the energy parameter.

* * * * *

UNITED STATES PATENT AND TRADEMARK OFFICE
CERTIFICATE OF CORRECTION

PATENT NO. : 10,656,970 B2
APPLICATION NO. : 15/279315
DATED : May 19, 2020
INVENTOR(S) : Xia et al.

Page 1 of 1

It is certified that error appears in the above-identified patent and that said Letters Patent is hereby corrected as shown below:

In the Claims

In Column 15, Line 30, in Claim 1, after "1", insert --,--

In Column 17, Line 3, in Claim 12, after "1", insert --,--

Signed and Sealed this
Fifteenth Day of December, 2020

Andrei Iancu
*Director of the United States Patent and Trademark Office*